United States Patent [19]
Inuiya et al.

[11] 4,152,722
[45] May 1, 1979

[54] RETRIEVAL SYSTEM

[75] Inventors: Masafumi Inuiya, Asaka; Hiroyuki Ueda, Tokyo, both of Japan

[73] Assignee: Fuji Photo Film Co., Ltd., Minami-ashigara, Japan

[21] Appl. No.: 872,212

[22] Filed: Jan. 25, 1978

Related U.S. Application Data

[63] Continuation-in-part of Ser. No. 669,915, Mar. 24, 1976, abandoned.

[30] Foreign Application Priority Data

Mar. 24, 1975 [JP] Japan .................................. 50-35942

[51] Int. Cl.² .......................... H04N 7/18; G03B 23/08
[52] U.S. Cl. ................................. 358/102; 353/27 A; 358/93; 358/210
[58] Field of Search .................. 358/102, 93, 104, 210; 353/26 K, 27 R, 27 A

[56] References Cited

U.S. PATENT DOCUMENTS

| | | | |
|---|---|---|---|
| 3,697,680 | 10/1972 | Anstin | 358/102 |
| 3,749,830 | 7/1973 | Blitchington | 358/101 |
| 3,870,814 | 3/1975 | Woods | 358/102 |

*Primary Examiner*—Howard W. Britton
*Attorney, Agent, or Firm*—Fleit & Jacobson

[57] ABSTRACT

A recording medium such as a microfiche bearing graphic information like a map in a reduced scale is provided in a retrieval unit including an optical projection system connected with a television type display device. The recording medium is moved with respect to the optical projection system by an X-Y moving device which is operated by an electric position signal. The electric position signal is given by a position detecting device. The position detecting device has a graphic information similar to that recorded in the recording medium and a detecting pen to point a desired spot on the graphic information and a joy stick to give the position signal to the X-Y moving device.

8 Claims, 6 Drawing Figures

RETRIEVAL SYSTEM

This application is a continuation-in-part of Ser. No. 669,915, filed Mar. 24, 1976, now abandoned.

BACKGROUND OF THE INVENTION

1. Field of the Invention

This invention relates to a graphic information retrieval system, and more particularly to a system for retrieving a part of a graphic information such as a map recorded on a recording medium in reduced scale and displaying the retrieved part thereof in a display device in enlarged scale.

2. Description of the Prior Art

Drawings or figures bearing two dimensionally extending graphic information such as maps, circuit diagrams, piping plans and other kind of plans like blueprints are usually divided into several pages to facilitate the handling thereof. One of this kind of information divided into a number of pages is an atlas. The atlas includes a map of small reduction ratio in addition to a number of detailed maps of comparatively large reduction ratio so that a desired detailed map can easily be found. In a microfilm system, a map is divided into several image frames of a microfilm. Therefore, in practical use of the atlas or the microfilm map viewing system, it is necessary to turn the pages or to feed the frames several times to find a desired spot in the map. It is possible to connect a computer to a microfilm reading system to perform a direct retrieval of a spot of the map. However, this will need a great capacity of memory, which results in a great increase in the cost. Further, it is often desired to see a map along a road extending over several pages. In such a case, it takes a long time and needs a troublesome turning of the pages or feeding of the frames to see the map as desired.

Particularly in case of emergency in a police office, for instance, finding a spot on a map upon receipt of an emergency phone or the like, it is often desired to guide a squad car to the spot by viewing a road map. In other emergency works such as fire services, gas, water and electricity services also, it is required to quickly find the spot concerned.

SUMMARY OF THE INVENTION

The primary object of the present invention is to provie a graphic information retrieval system in which a spot on the graphic information such as a map or the like can be found easily and quickly.

Another object of the present invention is to provide a graphic information retrieval system in which the graphic information such as a map or the like can be displayed with various reduction ratios.

Still another object of the present invention is to provide a graphic information retrieval system in which a spot of the graphic information displayed can be varied continuously.

A further object of the present invention is to provide a graphic information retrieval system in which a spot of the graphic information such as a map or the like can be retrieved continuously along a line such as a road in a map.

The system in accordance with the present invention is characterized in that a figure which is similar to a figure recorded in reduced scale on a recording medium and displayed in enlarged scale on a display device is used for retrieving a spot in the figure. The system of this invention is applied to a figure retrieval system in which an information recording medium bearing an image of a map or the like in reduced scale is supported by and moved in X and Y directions by a holder and the image on the recording medium is displayed in enlarged scale on a display device. By moving the recording medium in the X and Y directions, various parts of the image are displayed. The movement of the holder is controlled by an electric control means. In accordance with the present invention, a figure such as a map which is similar to the image recorded in the recording medium is provided beside the microfilm reader, and a position detecting means is used in combination therewith to operate said electric control means. The position detecting means includes for instance a detecting pen which has a function to generate a position signal when it is used to point a position in said figure.

DESCRIPTION OF THE PREFERRED EMBODIMENT

Figure 1:
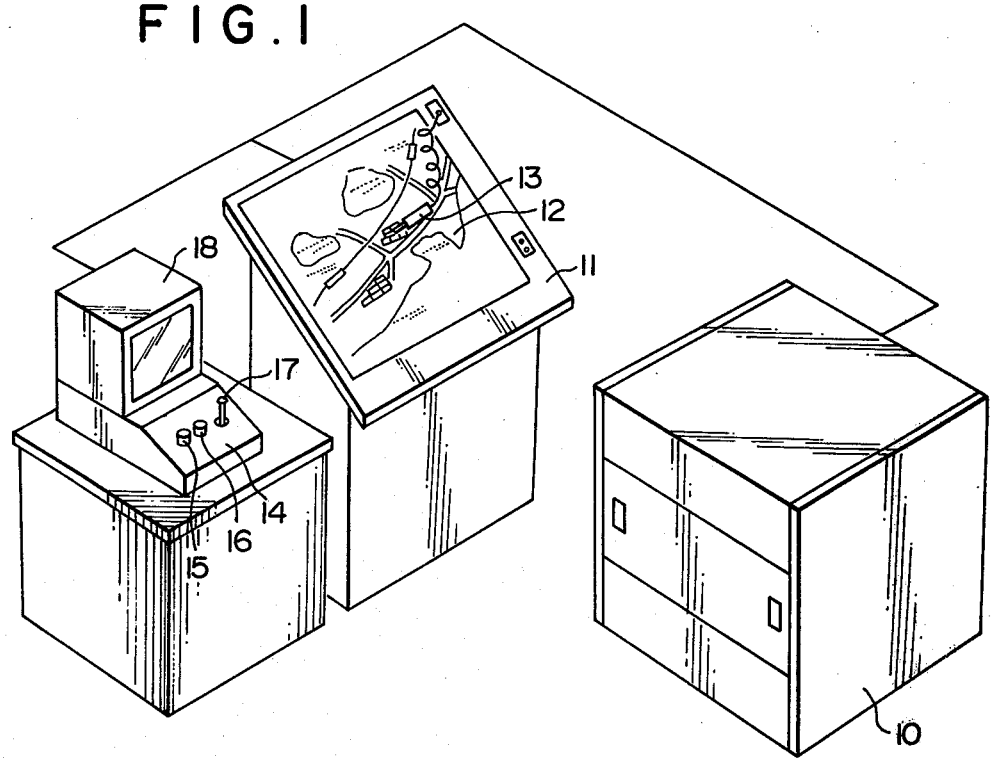
FIG. 1 is a perspective view showing an example of a map retrieval system emmbodying the system in accordance with the present invention.

An example of a retrieval system which embodies this invention is shown in FIG. 1. This system comprises a super-microfiche retrieval unit 10, a position detecting device 11, an operation table 14, and a television monitor 18.

The position detecting device 11 is provided with a map 12 for instance of a town in which rough information such as streets, areas and stations with the name thereof is shown. For example, the map 12 is on a scale of one to fifty thousand.

The super-microfiche retrieval unit includes a super-microfiche 20 (FIG. 2) which bears a detailed map of the town showing individual houses, buildings with the name thereof and other detailed information. The super-microfiche 20 consists of a number of microfiche elements on each of which a corresponding part of a map on a scale of one to one thousand is recorded in a reduced scale of one hundredth. The prepared microfiche elements are connected with each other to constitute the microfiche 20.

The super-microfiche retrieval unit 10 generates an output for displaying detailed information of a part of the map according to a position signal given thereto by the position detecting device 11. When a position signal which represents a certain spot of the map 12 is given to the super-microfiche retrieval unit 10, the unit 10 gives an output which effects to display a detailed map of said certain spot of the map 12. The unit 10 includes an image pick-up tube and an optical projection system for focusing an image of the map on the tube. The map is moved relative to the tube according to the position signal given thereto.

Figure 2:
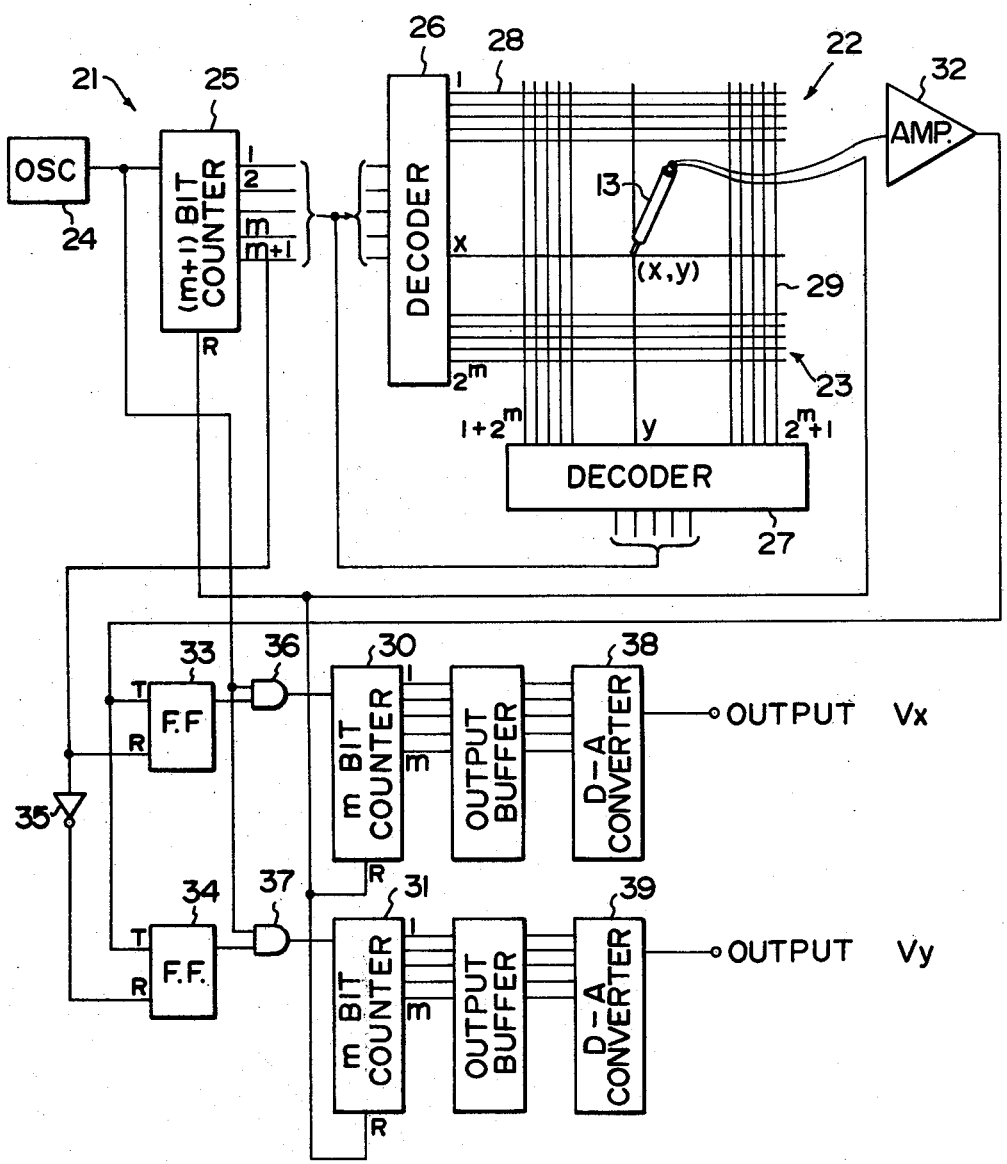
FIG. 2 shows an example of the position signal generating circuit used in the map retrieval system shown in FIG. 1.

The position detecting device 11 will be described in detail with reference to FIG. 2.

The position detecting device 11 comprises the map 12, a position signal generating circuit 21 having a tablet 22, and a detecting pen 13 which cooperates with the circuit 21 to generate a position signal. The map 12 is supported on the tablet 22. The tablet 22 includes multipolar stylus electrodes 23 arranged in the form of a lattice. The multiple electrodes comprises X-direction electrodes 28 and Y-direction electrodes 29. An oscillator 24 supplies clock pulses to a binary counter 25, in which the clock pulses is divided. Decoders 26 and 27 are connected between the counter 25 and the X-direction electrodes and the Y-direction electrodes, respectively. The decoders 26 and 27 receive the divided clock pulses from the counter 25 and supply pulses to the X-direction electrodes 28 and Y-direction electrodes 29 progressively.

One output of the detecting pen 13 is connected with the reset terminal R of the counters 25 and reset terminals R of binary counters 30 and 31. When the tip of the detecting pen 13 is depressed in response to action of the pen 13 to point at a portion of the map 12, the pen 13 supplies a reset release signal to the reset terminals R of the counters 25, 30 and 31.

The other output of the detecting pen 13 is connected with the input of an amplifier 32 the output of which is connected with trigger terminals T of flip-flops 33 and 34. A reset terminal R of the flip-flop 33 is connected with the output No. $m+1$ of the counter 25. A reset terminal R of the flip-flop 34 is connected with the output No. $m+1$ of the counter 25 via an inverter 35. The outputs of the flip-flops 33 and 34 are connected with one input of AND gates 36 and 37, respectively. The other input of each of the AND gates 36 and 37 is connected with the oscillator 24.

Assuming that the pen 13 points at a position (x, y) on the tablet 22, the operation of the position signal generating circuit 21 will be as follows.

When the tip of the detecting pen 13 is depressed, the detecting pen 13 supplies a reset release signal to the counters 25, 30 and 31. The counter 25 therefore starts counting the pulses from the oscillator 24. The decoder 26 and 27 receive the outputs of the counter 25 and cause the pulses corresponding to the outputs to scan the X-direction and Y-direction electrodes 28 and 29. The outputs of No. 1 to No. m are supplied to the decoder 26 and the outputs of No. $m+1$ to No. $2m+1$ are supplied to the decoder 27.

When the counter 25 supplies the outputs to the decoder 26, the output of No. $m+1$ is 0, and accordingly the reset terminal R of the flip-flop 33 receives OFF signal. While, the OFF signal is changed to ON signal by the inverter 35 and is supplied to the reset terminal R of the flip-flop 34.

When a pulse is supplied to the electrode No. x of the X-direction electrodes, the detecting pen 13 detects the pulse and the amplifier 32 supplies a detect signal to the trigger terminals T of the flip-flops 33 and 34. The output of the flip-flop 33 outputs ON signal to the one input of the AND gate 36. Therefore, after the pen 13 detects the pulse on the electrode No. x, the pulses from the oscillator 24 pass the gate 36 and are supplied to the counter 30. Since, when the output No. $m+1$ of the counter 25 outputs ON signal the reset terminal R of the flip-flop 33 turns ON, the output of the flip-flop 33 outputs OFF signal. Accordingly, the AND gate 36 does not give an output. Consequently, the counter 30 counts pulses up to $(2^m - x)$. The output of the counter 30 is supplied to a digital-to-analogue converter 38, which convert the digital output of $(2^m - x)$ to an analogue voltage output Vx.

While, when the output No. $m+1$ of the counter 25 outputs ON signal, the reset terminal R of the flip-flop 34 receives OFF signal, and therefore the reset of the flip-flop 34 is released. In the same manner as in the case of output Vx, a digital-to-analogue converter 39 outputs a voltage output Vy.

Thus, the position signal generating circuit 21 generates the position signal in the form of voltage (Vx, Vy) corresponding to the position (x, y) on the map 12. The position signal (Vx, Vy) is supplied to the super-microfiche retrieval unit 10.

Figure 3:
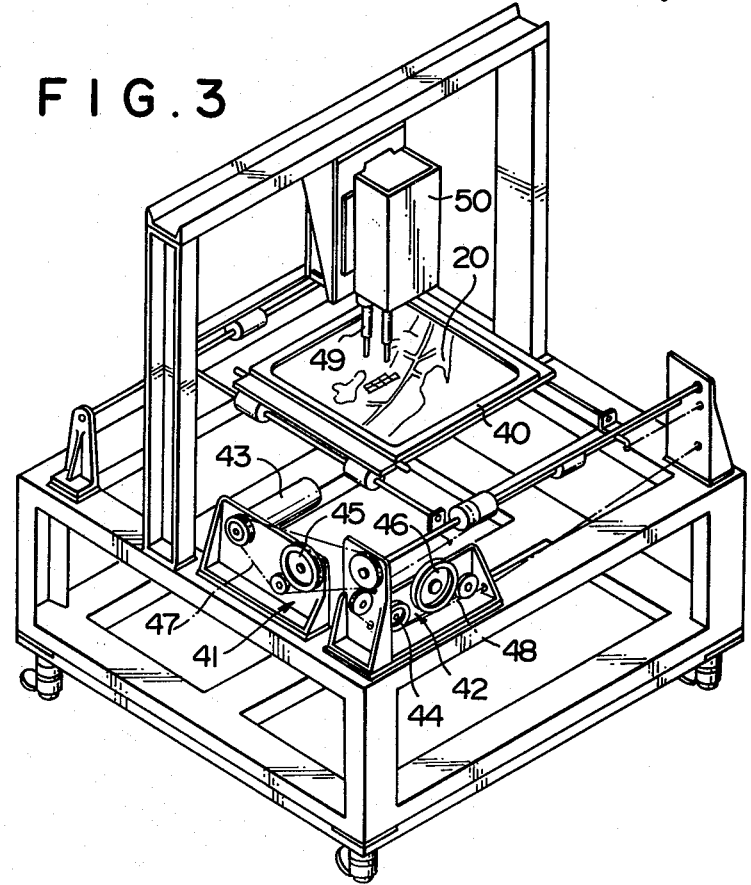
FIG. 3 is a perspective view showing the internal structure of a super-microfiche retrieval unit employed in the map retrieval system shown in FIG. 1.
Figure 4:
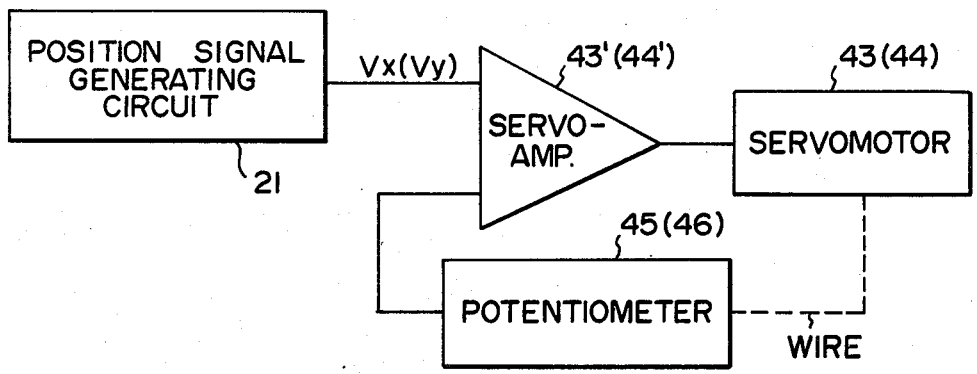
FIG. 4 is a block diagram which shows an example of the X-Y moving means used in the map retrieval system shown in FIG. 1.

The super-microfiche retrieval unit 10 will now be described in more detail with reference to FIG. 3. The super-microfiche 20 bearing the detailed map is supported by a holder 40 which is moved in a horizontal plane by an X-Y moving means 41 and 42. The X-Y moving means 41 and 42 are comprised of two servomotors 43, 44, potentiometers 45, 46 and servoamplifiers 47, 48 (FIG. 4). The servomotors 43, 44 are operatively connected with the holder 40 by means of wires 47, 48, respectively.

The servoamplifier 47 compares the position signal Vx from the position signal generating circuit 21 with the voltage of the potentiometer 45 to generate a signal of the difference therebetween. The servomotor 43 is rotated by the signal of the difference from the servoamplifier 43'. The servomotor 43 rotates the potentiometer 44. The servomotor stops when the voltage of the potentiometer 44 coincides with the position signal Vx. Accordingly, the microfiche 20 supported on the holder 40 is moved and positioned at an X-direction position in connection with the position signal Vx from the position signal generating circuit 21. In the same manner, the microfiche 20 is moved and positioned at a Y-direction position in connection with the position signal Vy by a servomotor 44, a potentiometer 46 and a servoamplifier 44'.

When the positioning of the X-direction position and Y-direction position of the microfiche is performed, the central portion of the part of the microfiche 20 corresponding to the position (x, y) of the map 12 is brought into alignment with the optical axis of an optical projection system 49 (FIG. 3) which is located above the microfiche 20. On the operation table 14, an image of the detected spot of the map 20 is displayed in the CRT of the television monitor 18 in enlarged scale. The operation table 14 is provided with a joy stick 17 for giving a position variating signal which comprises an X-direction component and a Y-direction component to be supplied to the X-Y moving means 41 and 42 to vary the position of the microfiche 20 in the super-microfiche retrieval unit 10. This joy stick 17 is conventionally known as a means for giving a position varying signal in a graphic display device in a computer system. The output signal of the joy stick 17 ($\Delta$Vx, $\Delta$Vy) is added to the output signal of the position signal generating circuit 21 (Vx, Vy), and accordingly the total value (Vx + $\Delta$Vx, Vy + $\Delta$Vy) is put into the X-Y moving means 41 and 42 in the super-microfiche retrieval unit 10 for controlling the position of the super-microfiche 20. Therefore, by moving the joy stick 17 back and forth and from side to side, the part of the map displayed in the television monitor 18 varies accordingly.

The output projection system 49 includes an illumination light source, a condenser lens and a projection lenses for focusing an image of a part of the map recorded on the microfiche 20 on the face of an image pick-up tube of a television camera 50 to produce an output signal representing the part of the map projected on the image pick-up tube. The projection lens system may be comprised of a plurality of selectable lenses mounted on a lens turret to change the scale of the map to be displayed.

Figure 5:
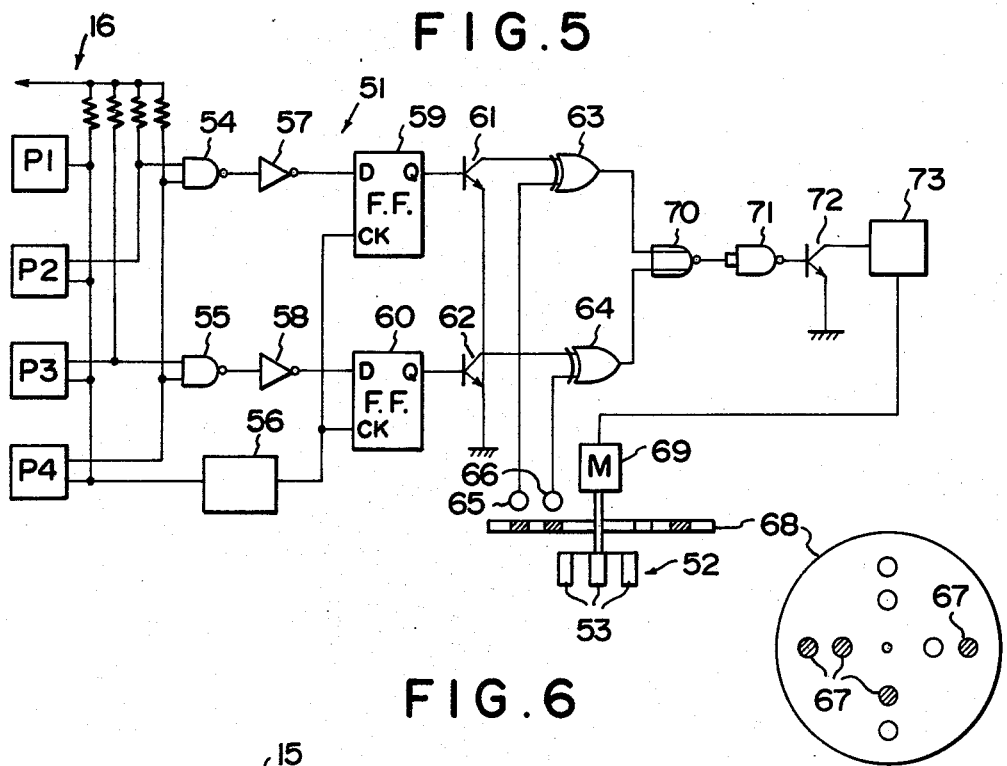
FIG. 5 shows an example of the lens selection circuit used in the map retrieval system shown in FIG. 1.
Figure 6:
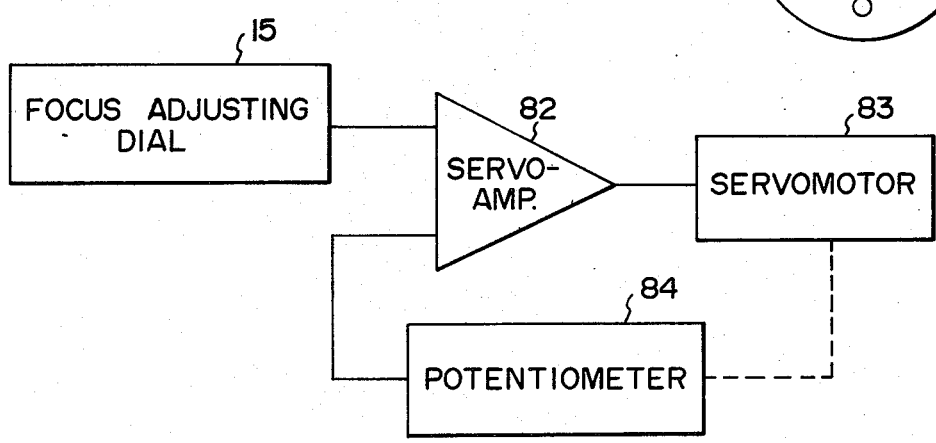
FIG. 6 is a block diagram which shows an example of the focus adjusting circuit used in the map retrieval system shown FIG. 1.

Referring to FIG. 5, a lens selection circuit 51 to be used for a lens turret 52 having four selectable lenses 53 will hereinbelow be described.

A lens changing switch 16 (FIG. 1) is disposed on the operation table and is rotatable to take one of four positions P1, P2, P3 and P4 respectively corresponding to the four lenses 53. When the switch 16 is placed at one of the positions P1, P2, P3 and P4, NAND gates 54 and 55 and a monostable multivibrator 56 receive signals from the switch 16.

Assuming that the switch 16 is placed at the position P1, all of the inputs of the NAND gates 54 and 55 are "1," and accordingly the NAND gates 54 and 55 at the outputs are "0." The two signals "0" are inverted to "1" by means of inverters 57 and 58, respectively. The signals "1" are supplied to inputs D of flip-flops 59 and 60. While, inputs CK of the flip-flops 59 and 60 receive a clock pulse from the monostable multivibrator 56. The flip-flops 59 and 60 output "1" at the terminals Q, and therefore transistors 61 and 62 are turned ON. Consequently, one input of each of exclusive OR gates 63 and 64 is "0." The other inputs of the exclusive OR gates 63 and 64 receive signals from Hall devices 65 and 66. When the Hall devices 65 and 66 detect magnets 67 disposed on a code disc 68 in connection with the positions P1, P2, P3 and P4 of the switch 16, the Hall devices supply a signal "0." The code disc 68 is coaxially connected with the turret 52 and the code disc 68 and the turret 52 are simultaneously rotated by a motor 69.

For example, if the Hall device 65 detects the magnet on the code disc 68, the Hall device 65 supplies a signal "0" to the other input of the exclusive OR gate 63. Since the exclusive OR gate 63 at the one input is "0," the exclusive OR gate 63 at the output is "0." However, if the Hall device 66 does not detect the magnet, the Hall device 66 supplies a signal "1" to the other input of the exclusive OR gate 64. Since the one input of the exclusive OR gate 64 is "0," the exclusive OR gate 64 at the output is "1."

The output of the exclusive OR gate 63 is connected with one input of a NOR gate 70, and the output of the exclusive OR gate 64 is connected with the other input of the NOR gate. When, as mentioned above, the one input is "0" and the other input is "1," the NOR gate 70 at the output is "0." The signal "0" is inverted to "1" by a NAND gate 71, and accordingly a transistor 72 turns ON. When the transistor 72 turns ON, a relay 73 causes the motor 69 to rotate. The motor 69 rotates the turret 52 with the code disc 68.

If the Hall devices 65 and 66 detect the magnets as shown in FIG. 5, the other input of each of the exclusive OR gates is "0." Accordingly, the exclusive OR gates 63 and 64 at the outputs are "0," and then the NOR gate 70 at the output is "1." The signal "1" is inverted to "0" by the NAND gate 71. Therefore, the transistor 72 turns OFF thereby to stop the motor 69. Thus, a lens 53 is selected.

A lens focus adjusting circuit is comprised of a focus adjusting dial 15 provided on the operation table 14, a servoamplifier 82, a servomotor 83 and a potentiometer 84. The servoamplifier 82 compares a voltage output proportional to the rotation of the focus adjusting dial 15 with the voltage of the potentiometer 84 to output a signal indicative of the difference therebetween. The servomotor 83 is rotated by the signal of the difference from the servoamplifier 82 to move at least one lens of the projection lens system. The servomotor 83 is operatively connected with the potentiometer 84, and thus the servomotor 83 rotates the potentiometer 84. The servomotor 83 stops when the voltage of the potentiometer 84 coincides with the voltage from the focus adjusting dial 15. Thus, the focusing position of the projection lens system is adjusted.

When all of the above adjustments are completed, a desired image of the pointed spot of the detailed map recorded on the super-microfiche 20 is displayed in the television monitor 18 in enlarged scale. The operator operates the joy stick 17 to find out an individual house or building in the display map. Since the joy stick 17 is capable of continuously moving a part of the map on the television monitor 18, it is useful for seeing a map along a line such as a street, a river or a railway.

We claim:

1. A graphic information retrieval system comprising in combination:

graphic information recording medium carrying recorded thereon in reduced scale two-dimensionally extending optically readable graphic information, a display means for displaying a part of said graphic information in enlarged scale, said display means including an optical reading means having an optical axis extending perpendicular to said graphic information and an electric display means which displays the information read by said optical reading means, means for moving said graphic information recording medium in a plane in which said information two-dimensionally extends upon receipt of an electric position signal to bring various portions of said graphic information into alignment with said optical axis of the optical reading means, and a position signal generating means including a graphic information carrying means which carries graphic information similar to said graphic information recorded in said recording medium, and detecting means which points at a position on the graphic information and generates an electric position signal representing the pointed at position to be given to said recording medium moving means.

2. A graphic information retrieval system as defined in claim 1 wherein said graphic information is a map and said recording medium is a microfilm on which the map is recorded in reduced scale.

3. A graphic information retrieval system as defined in claim 2 wherein said map recorded on the microfilm is a detailed map showing individual buildings and houses.

4. A graphic information retrieval system as defined in claim 1 wherein said electric display means is a television monitor, and said optical reading means comprises an image pick-up tube electrically connected with said television monitor and an optical projection system which focuses an image of a part of said graphic information carried by said recording medium on said image pick-up tube.

5. A graphic information retrieval system as defined in claim 1 wherein said detecting means of said position signal generating means includes a detecting pen which is used to point at a spot on said graphic information carried by said graphic information carrying means in the position signal generating means.

6. A graphic information retrieval system as defined in claim 5 wherein said position signal generating means further includes a joy stick for operating said recording medium moving means to move the recording medium continuously from the position which is determined by said detecting pen.

7. A graphic information retrieval system as defined in claim 1 wherein said display means further includes means for changing the ratio of enlargement of the image displayed by the electric display means.

8. A graphic information retrieval system as defined in claim 7 wherein said ratio changing means comprises a lens turret including a selectable plurality of lenses of different focal length provided in said optical reading means and externally operable electric input means provided on said display means for giving a signal to said lens turret to select one of the lenses.

* * * * *